United States Patent Office.

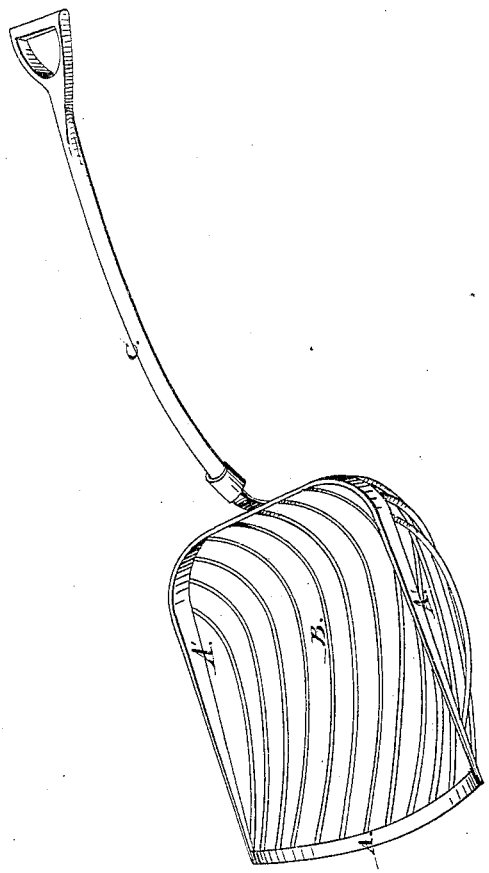

EUGENE BROWN AND WILLIAM POOL, OF BIRMINGHAM, MICHIGAN.

Letters Patent No. 62,730, dated March 12. 1867.

---

IMPROVEMENT IN POTATO SCOOP.

---

*The Schedule referred to in these Letters Patent and making part of the same.*

---

TO ALL WHOM IT MAY CONCERN:

Be it known that we, EUGENE BROWN and WILLIAM POOL, of Birmingham, in the county of Oakland, and State of Michigan, have invented a new and useful Improvement in Shovels for Shovelling Potatoes; and we do hereby declare that the following is a full, clear, and exact description of the same, reference being had to the annexed drawings, making part of this specification, in which the shovel is represented in perspective.

The following description will enable any one skilled in the art to make my improved potato shovel.

The point of the shovel is formed of a rounded strip, A, the front edge of which is made round so as not to cut the potatoes when the shovel is being used. The frame A' is extended around so as to form the side and back of the shovel. Bars B extend from the frame B to the edge A, curved as shown, so as to form the shovel into the general shape of the ordinary scoop shovel. The space between the bars must be sufficient to allow the small stones and dirt to fall through the shovel, but less than the diameter of the potatoes. C is the handle fastened to the back part of the frame A' in the ordinary manner.

What we claim as our invention, and desire to secure by Letters Patent, is—

As an article of manufacture, a potato shovel A, A', B, constructed substantially as described.

In testimony whereof we have signed our names to this specification in the presence of two subscribing witnesses.

EUGENE BROWN,
WILLIAM POOL.

Witnesses:
WM. BROWN,
GEO. L. LEE.